…

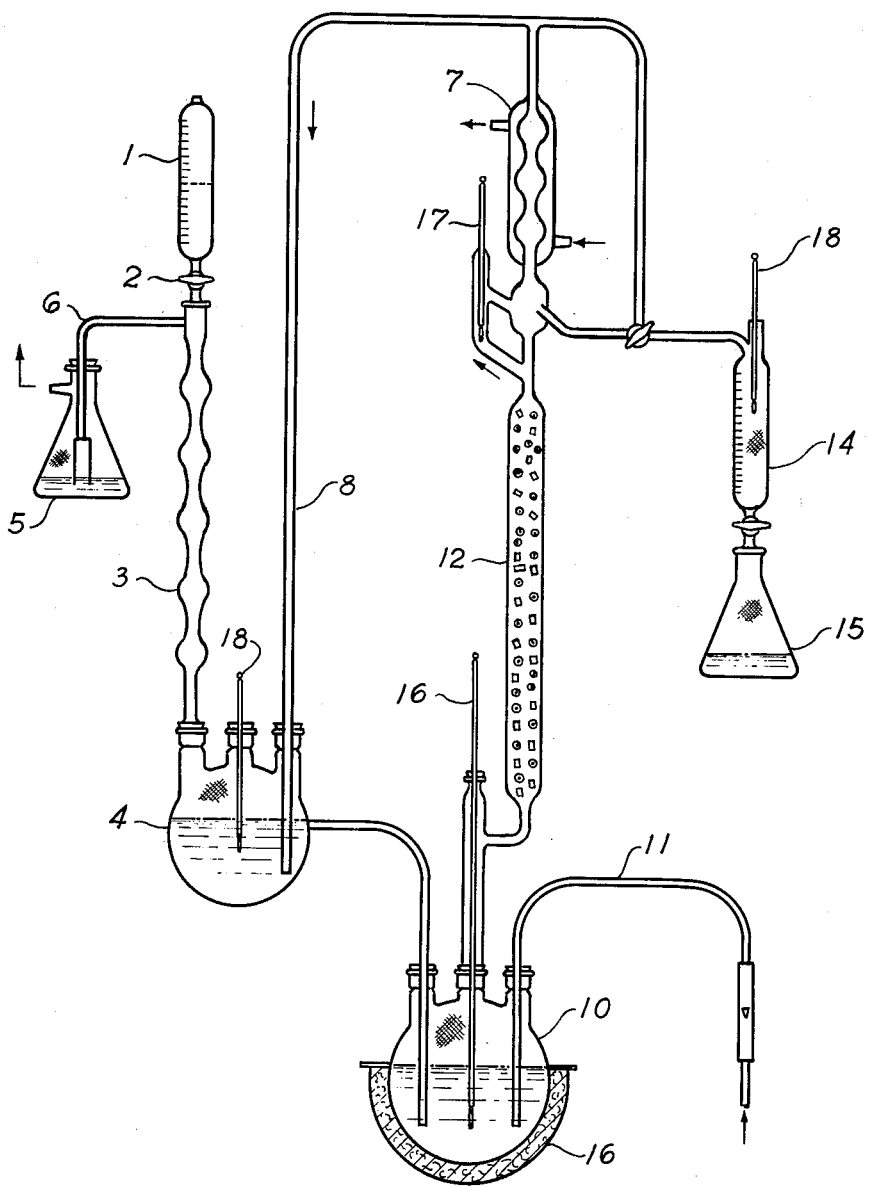

United States Patent Office 3,219,413
Patented Nov. 23, 1965

3,219,413
PROCESS FOR PRODUCTION OF SULFUR DICHLORIDE
Karl E. Kunkel, Grand Island, and David S. Rosenberg, Niagara Falls, N.Y., assignors to Hooker Chemical Corporation, Niagara Falls, N.Y., a corporation of New York
Filed Oct. 13, 1961, Ser. No. 145,028
17 Claims. (Cl. 23—205)

This invention relates to the production of substantially pure sulfur dichloride. More specifically, the inventive concept resides in a process for the production of sulfur dichloride by the chlorination of a sulfur chloride mixture with simultaneous fractional distillation.

Sulfur dichloride has been prepared by the liquid-phase chlorination of sulfur monochloride in the presence of a Lewis-acid catalyst such as $FeCl_3$, $SbCl_5$, or $AlCl_3$. The end product of this chlorination is an equilibrium mixture containing eighty-five to ninety percent of sulfur dichloride at room temperature. Since the atmospheric boiling point of sulfur dichloride is fifty-nine degrees centigrade and that of sulfur monochloride is one hundred and thirty-eight degrees centigrade, separation by fractional distillation would seem a simple matter. Appreciable decomposition occurs during such distillation however, and poor recovery of high assay sulfur dichloride is obtained. Addition of various stabilizers to the still charge has been proposed wherein appreciable quantities of stabilizers are used; this excessive amount may be undesirable for certain applications. Some of the stabilizers used, such as $PCl_3$ inhibit subsequent chlorination of the residual sulfur monochloride so that recovery or disposal of the residue sulfur monochloride can become a major problem. The purification procedures for sulfur dichloride which have been used in the past generally involve batch chlorination, batch distillation, and residue disposal. The complexity of these various operations and the resultant processing difficulties have seriously inhibited development of large scale new uses of this important raw material.

The present invention is readily adapted to the requirements of a continuous process, resulting in extremely high purity sulfur dichloride, and one which avoids substantially all of the above noted prior art disadvantages. Included in the steps of this invention is the combination of simultaneous chlorination of mixtures sulfur monochloride and sulfur dichloride with a continuous fractional distillation. A relatively non-volatile chlorination catalyst may be added to the still pot, if desired. It is essential to this invention that catalysts which promote the equilibrium reaction of chlorine with sulfur monochloride be excluded from the fractionating column and the condenser system.

The process of this invention generally is carried out as follows: The equipment consists of a combination reactor and still pot which is surmounted by a fractionation column equipped with a reflux condenser. The reactor still pot is charged with a mixture of sulfur monochloride and sulfur dichloride, together with a chlorination catalyst of low volatility such as $FeCl_3$, if desired. The fractionation column may be either a bubble cap column fabricated of some inert material or it may be a packed column. Since a packed column is readily fabricated of non-metallic materials and provides less hold up of the liquid phase, this construction is preferred. The condenser must also be non-reactive and preferably non-metallic. The reactor still pot is heated to the boiling point of the still charge, which depends on the ratio of sulfur dichloride to sulfur monochloride in the mix. This ratio is not critical, however, and may be conveniently varied from fifty percent to ten percent sulfur dichloride, with a pot temperature varying from eighty degrees centigrade to one hundred and twenty-five degrees centigrade. It is preferred, however, to use a temperature of about one hundred and ten to one hundred and twenty degrees centigrade. In operation, the composition of the still charge is maintained constant by feeding chlorine and sulfur chlorides in such proportion as to have the total weight ratio of free and combined chlorine to sulfur greater than 2.22 to 1. With this feed a slight stoichiometric excess of chlorine in the reaction distillation system will result when making virtually pure sulfur dichloride and free chlorine will be present throughout the reaction distillation system. Excess chlorine from the condenser vent can be recycled to the reactor, either directly or by absorption in the feed liquor. The vapors leaving the liquid in the reboiler consist of sulfur dichloride, sulfur monochloride, and chlorine. As they progress upward through the column they are progressively enriched in sulfur dichloride, both by the physical process of fractional distillation and the chemical process of reaction. The vapors at the head of the column consist mainly of sulfur dichloride and chlorine. These vapors are passed through a condenser in which the sulfur dichloride is liquefied. A portion of the liquid is returned to the column as reflux, and the remainder constitutes the product, sulfur dichloride. The uncondensed vapors consist mainly of chlorine with some sulfur chlorides, may be recycled directly to the reactor still pot, or they may be recovered in a scrubbing column. Operation of the scrubbing column can be improved by the addition of a catalyst such as Fe or $FeCl_3$ to the sulfur chlorides used as a scrubber feed liquor. If storage of the sulfur dichloride product is desired, a suitable stabilizing material can be added to the liquid material. The following examples and disclosure relating to the drawings are intended to define the preferred embodiment of this invention. This invention, however, is not intended to be limited to the particulars set out in this ensuing discussion. Many modifications will become apparent to one skilled in the art upon a reading of this disclosure; these modifications are intended to be encompassed in the spirit of this invention. The following examples will more clearly illustrate the specifics of this invention.

*Example 1*

Eight hundred and eighty-one grams of crude sulfur dichloride containing about seventy percent sulfur dichloride and about thirty percent sulfur monochloride were put into a two-liter flask equipped with a thermometer well and a well line for feeding it chlorine gas. A packed column three-quarters of an inch in diameter and thirty inches high was mounted above the flask and attached to the flask by a 24–40 glass joint. The flask was heated by an electric heating mantle. The column was packed with twenty-four inches of granular activated carbon. A brine cooled reflux condenser was mounted at the head of the column, with a magnetic reflux device for controlling the reflux ratio. Chlorine was fed continuously at a rate of twenty-four grams an hour for two ond one-half hours. The temperature of the flask was maintained at the boiling point of the liquid during this period, and rose gradually from sixty degrees centigrade at the start of the run to one hundred and eight degrees centigrade at the end. The reflux ratio was kept at a one to four during most of the run. During this period there were collected two hundred and eighty-five grams of distillate which assayed virtually pure sulfur dichloride. At the conclusion of the run, the contents of the flasks were drained and weighed. The residue amounted to four hundred and forty-three grams, and vapor losses were two hundred and eighteen grams.

Example 2

The equipment used in Example 1 was modified as follows:

(a) A feed line was added to the flask to permit continuous addition of sulfur mono-chloride-dichloride mixture to the reaction still pot. Control of the feed rate is by liquid level.

(b) The carbon packing in the column was replaced with one-quarter inch porcelain saddles.

(c) The condenser was cooled with water at fifteen degrees centigrade instead of brine.

(d) The vent gases from the condenser were absorbed in the sulfur chloride feed mixture.

The reaction flask was charged with 780.8 grams of a feed material comprising sixty-five percent sulfur monochloride and thirty-five percent sulfur dichloride and containing about .5 percent ferric chloride ($FeCl_3$). The liquid feed vessel was charged with two thousand grams of the same feed stock. Chlorine was fed at the rate of one hundred and twenty-five grams per hour to the reaction vessel, which was kept at a temperature of one hundred and fifteen degrees centigrade to one hundred and twenty degrees centigrade during the run. The mixed sulfur chlorides were fed continuously at a rate of about three hundred and forty grams an hour to maintain a constant level in the reaction reboiler. The reflux ratio was about one to one. These conditions were maintained for approximately 5.9 hours, at the end of which period, a total feed of about seven hundred and forty grams of chlorine and two thousand grams of sulfur chlorides had been supplied to the reaction flask. A total product of two thousand, seven hundred and four was recovered, which assayed less than 0.5 sulfur monochloride. The product was stabilized for further studies. Total losses of sixty grams amounted to only 2.2 percent of the sulfur dichloride produced.

Example 3

The equipment used in Example 2 was modified by the addition of four inches of iron tacks above the packing at the head of fractionation column. Chlorine was fed at the rate of one hundred grams an hour with mixed sulfur chloride (sulfur monochloride and sulfur dichloride), at the rate of three hundred grams an hour. A reflux ratio of 1.5 was used, with a reaction temperature of one hundred and fifteen to one hundred and twenty-eight degrees centigrade. Operation was so erratic and product losses to the vent so great that the run was discontinued. This example illustrates very clearly that it is critical to this invention that chlorination catalyst be rigidly excluded from the fractionation system of this invention.

The following drawing and corresponding examples will illustrate the specifics of this invention. The accompanying drawing shows, diagrammatically, one embodiment of a production system constructed in accordance with this invention.

In this drawing is illustrated an arrangement of glass equipment for carrying out this invention. This arrangement provides for the recycling and recovery of chlorine which may escape the distillation reaction section by absorption in the feed liquors.

The system was operated for a period of four and three-quarter hours, during which time two thousand grams of feed liquor, approximately thirty-five percent sulfur dichloride and sixty-five percent sulfur monochloride, was fed in from the graduated dropping funnel 1, at a slow steady rate regulated by stopcock (2). This liquor percolated down through the chlorine absorption column 3, where it contacted whatever chlorine escaped the flask 4. The bubbler 5 indicated escape of unabsorbed gas by way of vent tube 6, and the rate of chlorine supply was adjusted to minimize such loss. Flask 4 is a scrubbing or absorption flask, whose function is the same as that of column 3, as well as to provide a feed reservoir. Chlorine escaping the distillation-reaction system is fed from the top of the condenser 7 into flask 4, through the recycle tube 3, so that it bubbles up through the supply of feed liquor therein. Thermometer 9 indicates, by the rise in temperature above that of the fresh feed, the extent of the absorption taking place in flask 4. During the run described, this temperature rise was four to ten degrees centigrade.

The feed liquors, fortified by absorbed and reacted chlorine, overflowed from flask 4 through tube 9 into flask 10, which was the combined distillation reboiler and reactor. The liquors leaving flask 4 now normally contained approximately forty percent $SCl_2$, although higher or lower concentrations were handled without difficulty in other runs. The liquor in flask 10 was maintained at a temperature of one hundred and ten to one hundred and twenty degrees centigrade by the electric heating mantle 16. This temperature range corresponds roughly to a concentration range of fifteen to ten percent sulfur dichloride in sulfur monochloride. Thus, it is seen that the supply of sulfur dichloride brought into flask 10 in the feed liquor was continuously boiled away. Chlorine gas was bubbled into the liquor through the flowmeter and feed tube 11, at a rate sufficient to balance the influx of sulfur monochloride. A portion of the chlorine reacted with the sulfur monochloride in flask 10, the remainder passing upward through the fractionating column 12, along with vapors of sulfur dichloride and sulfur monochloride. In passing upward through the column the chlorine thus continuously contacted sulfur monochloride vapor as well as the descending reflux stream containing sulfur monochloride and sulfur dichloride. Reflux was controlled by reflux splitter (13). Most of the chlorine fed was reacted with the sulfur monochloride so that the combined result of the physical process of fractional distillation and the chemical process of chlorination was to produce a distillate, which was collected in receivers 14 and 15, containing ninety-seven to ninety-eight percent sulfur dichloride, 0.4 to 0.6 percent sulfur monochloride, and 0.6 to 1.4 percent free chlorine. Unreacted and undissolved chlorine passed upward through the condenser 7 and back through the recycle line 8 to the recovery flask 4, whose operation has already been described.

The following material balance summarizes the operation of the equipment during the typical four and three-quarter hours run described above:

| Contents of Vessel | Approx. Composition | At Start (grams) | At Finish (grams) |
| --- | --- | --- | --- |
| 1 Feed reservoir | 35% $SCl_2$, 65% $S_2Cl_2$ | 2,000 | 0 |
| 4 Apsorption Flask | 40% $SCl_2$, 60% $S_2Cl_2$ | 536.5 | 535.8 |
| 10 Combined reaction and distillation flask. | 10-15% $SCl_2$, bal. $S_2Cl_2$ | 780.8 | 782.9 |
| 14, 15 Distillate Receiver | 97-98% $SCl_2$ | 0 | 2703.9 |
| 5 Bubbler | $S_2Cl_2$ | 126 | 127.1 |
| Chlorine Added | | 740.0 | |
| | | 4,183.3 | 4,123.3 |

Loss=60 grams and approximately two percent of $SCl_2$ made.

Thermometer 16, by indicating the boiling temperature of the contents of flask 10 provided a means of estimating the composition in that flask. Thermometer 17 indicated the vapor-liquid equilibrium temperature at the head of the reflux column, and was maintained at fifty-seven to 58.5 degrees centigrade throughout the run.

It is evident that the essential features of this invention may be carried out without the chlorine absorption column 3 and flask 4. When so operated, feed liquors are supplied from any source through tube 9 directly to flask 10, and unreacted chlorine is vented from the top of condenser 7.

Furthermore, batch operation may be practiced by withholding the supply of feed liquor from tube 9, and working entirely on the reserve of liquor contained in flask 10.

Various changes and modifications may be made in the method and in the apparatus of this invention, certain preferred forms of which have been herein described, without departing from the spirit or scope of this invention. These modifications of this basic invention are to be regarded as within the scope and purview of this invention.

We claim:

1. A process for the production of substantially pure sulfur dichloride which comprises contacting with chlorine a composition containing sulfur monochloride and sulfur dichloride at about 80 to about 125 degrees centigrade, substantially simultaneously therewith distilling the resulting mixture, and recovering substantially pure sulfur dichloride therefrom.

2. A process for the production of substantially pure sulfur dichloride which comprises continuously contacting with chlorine a composition containing sulfur monochloride and sulfur dichloride at about 80 to about 125 degrees centigrade, substantially simultaneously therewith distilling the resulting mixture, and recovering substantially pure sulfur dichloride therefrom.

3. A continuous process for the production of substantially pure sulfur dichloride which comprises continuously contacting with chlorine a composition containing predominantly sulfur monochloride and sulfur dichloride at about 80 to 125 degrees centigrade, substantially simultaneously therewith distilling the resulting mixture, and recovering substantially pure sulfur dichloride therefrom.

4. A process for the production of substantially pure sulfur dichloride which comprises introducing a composition containing sulfur dichloride and sulfur monochloride into a vessel, heating said vessel to about 80 to about 125 degrees centigrade, contacting said composition with chlorine while substantially simultaneously therewith distilling the resulting mixture, and recovering substantially pure sulfur dichloride therefrom.

5. A process for the production of substantially pure sulfur dichloride which comprises depositing a composition containing sulfur dichloride and sulfur monochloride in a vessel, heating said vessel to a temperature of about from eightly degrees centigrade to one hundred and twenty-five degrees centigrade, contacting said composition with chlorine while substantially simultaneously therewith distilling the resulting mixture, and recovering substantially pure sulfur dichloride therefrom.

6. A process for the production of substantially pure sulfur dichloride which comprises depositing a composition containing sulfur dichloride and sulfur monochloride in a vessel, heating said vessel to a temperature of one hundred and ten to one hundred and twenty degrees centigrade, contacting said composition with chlorine while substantially simultaneously therewith distilling the resulting mixture, and recovering substantially pure sulfur dichloride therefrom.

7. A process for the production of substantially pure sulfur dichloride which comprises depositing a composition containing sulfur dichloride and sulfur monochloride in a vessel, contacting said composition with a substance selected from the group consisting of Fe, $Fe_2S$, $FeCl_3$, and mixtures thereof, heating said vessel to a temperature of from about 80 to about 125 degrees centigrade, contacting said composition with chlorine while substantially simultaneously therewith distilling the resulting mixture, and recovering substantially pure sulfur dichloride therefrom.

8. A process for the production of substantially pure sulfur dichloride which comprises depositing a composition containing sulfur dichloride and sulfur monochloride in a vessel, adding to said composition a substance selected from the group consisting of Fe, $Fe_2S$, $FeCl_3$, and mixtures thereof, heating said vessel to a temperature of about from eighty degrees centigrade to one hundred and twenty-five degrees centigrade, contacting said composition with chlorine while substantially simultaneously therewith distilling the resulting mixture, and recovering substantially pure sulfur dichloride therefrom.

9. A process for the production of substantially pure sulfur dichloride which comprises depositing a composition containing sulfur dichloride and sulfur monochloride in a vessel, adding to said composition a substance selected from the group consisting of Fe, $Fe_2S$, $FeCl_3$, and mixtures thereof, heating said vessel to a temperature of about one hundred and ten to hundred and twenty degrees centigrade, contacting said composition with chlorine while substantially simultaneously therewith distilling the resulting mixture, and recovering substantially pure sulfur dichloride therefrom.

10. A process for the production of substantially pure sulfur dichloride which comprises feeding chlorine and a composition containing sulfur dichloride and sulfur monochloride to a vessel in such a proportion as to maintain a stoichiometric excess of chlorine in the production system, heating said vessel to a temperature of from about 80 to about 125 degrees centigrade, simultaneously with the addition of chlorine, distilling the resulting mixture, and recovering substantially pure sulfur dichloride therefrom.

11. A process for the production of substantially pure sulfur dichloride which comprises feeding chlorine and a composition containing sulfur dichloride and sulfur monochloride to a vessel in such a proportion as to maintain a stoichiometric excess of chlorine in the production system, heating said vessel to a temperature of about from eighty degrees centigrade to one hundred and twenty-five degrees centigrade, simultaneously with the addition of chlorine, distilling the resulting mixture, and recovering substantially pure sulfur dichloride therefrom.

12. A process for the production of substantially pure sulfur dichloride which comprises feeding chlorine and a composition containing sulfur dichloride and sulfur monochloride to a vessel in such a proportion as to maintain a stoichiometric excess of chlorine in the production system, heating said vessel to a temperature of about one hundred and ten degrees centigrade to one hundred and twenty degrees centigrade, simultaneously with the addition of chlorine, distilling the resulting mixture, and recovering substantially pure sulfur dichloride therefrom.

13. A process for the production of substantially pure sulfur dichloride which comprises feeding chlorine and a composition containing sulfur dichloride and sulfur monchloride to a vessel in such a proportion as to have the total weight ratio of free and combined chlorine to sulfur greater than approximately two to one, heating said vessel to a temperature of from about 80 to about 125 degree centigrade, simultaneously with the addition of chlorine, distilling the resulting mixture, and recovering substantially pure sulfur dichloride therefrom.

14. A process for the production of substantially pure sulfur dichloride which comprises feeding chlorine and a composition containing sulfur dichloride and sulfur monochloride to a vessel in such a proportion as to have the total weight ratio of free and combined chlorine to sulfur greater than approximately 2.22 to one, heating said vessel to a temperature from about 80 to about 125 degrees centigrade, simultaneously with the addition of chlorine, distilling the resulting mixture, and recovering substantially pure sulfur dichloride therefrom.

15. A process for the production of substantially pure sulfur dichloride which comprises feeding chlorine and a composition containing sulfur dichloride and sulfur monochloride to a vessel in such a proportion as to have the total weight ratio of free and combined chlorine to sulfar greater than approximately 2.22 to one, heating said vessel to a temperature of about from eighty degrees centigrade to one hundred and twenty-five degrees centigrade, simultaneously with the addition of chlorine distilling the resulting mixture, and recovering substantially pure sulfur dichloride therefrom.

16. A process for the production of substantially pure sulfur dichloride which comprises feeding chlorine and a composition containing sulfur dichloride and sulfur monochloride to a vessel in such a proportion as to have the total weight ratio of free and combined chlorine to sulfur greater than approximately 2.22 to one, heating said vessel to a temperature to one hundred and ten to one hundred and twenty degrees centigrade, simultaneously with the addition of chlorine, distilling the resulting mixture, and recovering substantially pure sulfur dichloride therefrom.

17. A process for the production of substantially pure sulfur dichloride which comprises feeding chlorine into a composition containing sulfur dichloride and sulfur monochloride at a temperature of about 80 to about 125 degrees centigrade in such a proportion as to have the total weight ratio of chlorine to sulfur greater than 2.22 to one, and simultaneously with the addition of chlorine distilling the resulting mixture and recovering substantially pure sulfur dichloride therefrom.

References Cited by the Examiner
UNITED STATES PATENTS

| | | | |
|---|---|---|---|
| 1,923,094 | 8/1933 | Jenness | 23—205 |
| 2,258,771 | 10/1941 | Klengelhoefer | 23—295 X |
| 3,071,442 | 1/1963 | Schmadebeck | 23—205 |

MAURICE A. BRINDISI, *Primary Examiner.*